(No Model.)
E. G. SELDEN & G. D. CHAMBERLAIN.
BRAKE MECHANISM FOR VELOCIPEDES.
No. 499,044. Patented June 6, 1893.
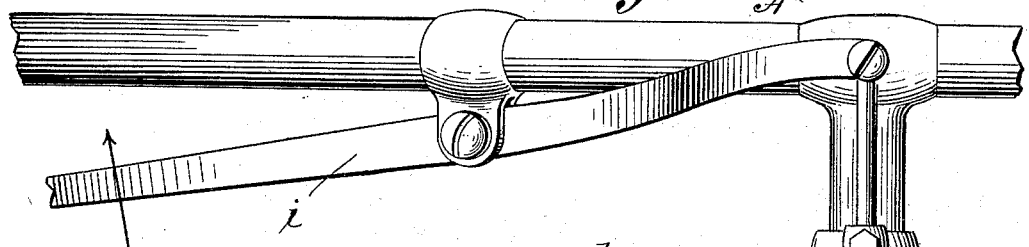
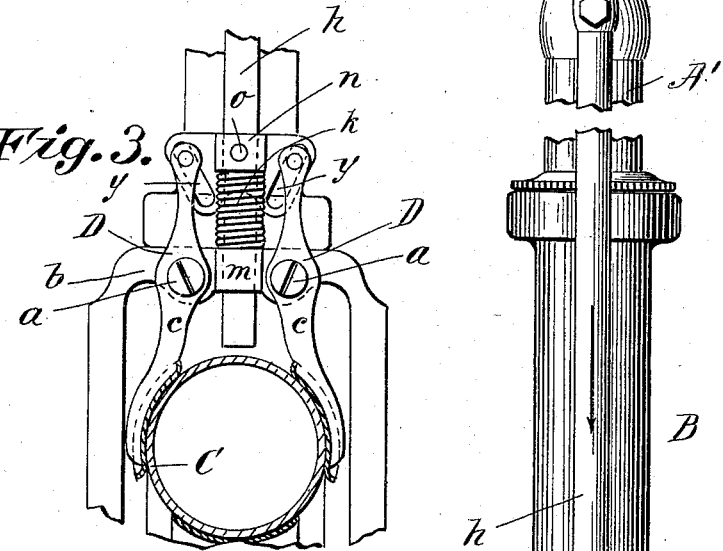
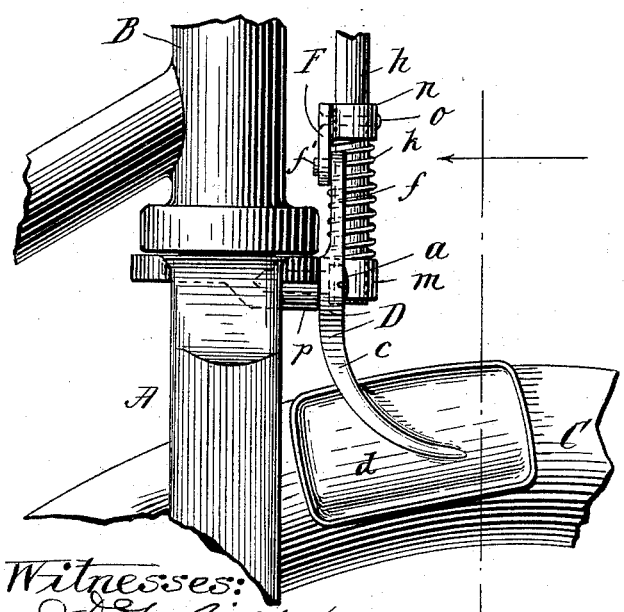
Witnesses:
Inventors
Edward G. Selden,
George D. Chamberlain,
per Chapin & Co. Attys

UNITED STATES PATENT OFFICE.

EDWARD G. SELDEN AND GEORGE D. CHAMBERLAIN, OF SPRINGFIELD, MASSACHUSETTS.

BRAKE MECHANISM FOR VELOCIPEDES.

SPECIFICATION forming part of Letters Patent No. 499,044, dated June 6, 1893.

Application filed October 31, 1892. Serial No. 450,502. (No model.)

*To all whom it may concern:*

Be it known that we, EDWARD G. SELDEN and GEORGE D. CHAMBERLAIN, citizens of the United States, residing at Springfield, in the county of Hampden and State of Massachusetts, have invented new and useful Improvements in Brake Mechanism for Velocipedes, of which the following is a specification.

The objects of this invention are to provide improved brake mechanisms for the avoidance of the constant exertion of the rider to maintain the brake pressures for long periods, as in coasting; and for the application of the brake pressure to the opposite sides of the tire instead of against the peripheral tread portion thereof for the avoidance of the injurious effects of the great pressures upon the periphery of the tire which as understood are especially destructive to pneumatic tires.

To these ends the invention consists in constructions and combinations of parts all substantially as will hereinafter fully appear and be set forth in the claim.

Reference is to be had to the accompanying drawings in which Figure 1 is a front elevation of the brake-mechanism applied at the head of a bicycle. Fig. 2 is an elevation of important portions of the mechanism seen at right angles to Fig. 1. Fig. 3 is a view of the principal parts, the same as seen in Fig. 1, showing the brake set.

While this brake-mechanism is here shown at the forward wheel, it may be applied with great advantage to the rear wheel.

In the drawings A represents a part of the front fork of the vehicle having the usual upwardly extended pillar or extension, A', to which the handle-bar, $A^2$, is connected, while B is the tubular head portion of the frame.

D D represent levers pivotally mounted, as at $a$, on the forward side of the upper uniting part, $b$, of the fork-legs, the lower arms, $c$, $c$, of the said levers being formed to constitute, or equipped with, the bearing members or brake-shoes, $d$, $d$. These brake-shoes are held at each side of the tire, C, as clearly seen. The upper arms, $f$, $f$, of the levers are extended above the points of their pivotal engagement with the fork standing in suitable separation. Each of the arms, $f$, $f$, has an offset stud, $f'$, and on the plunger or thrust-rod, $h$, operated by the usual brake-lever, $i$, is a block or plate, F, having the inclined and downwardly converging edge surfaces, $j$, $j$, which bear upon the approached sides of said studs, $f'$, $f'$, or upon friction rollers thereon. The downward thrust of the brake plunger-rod and corresponding downward movement of the plate, F, which is practically wedge-shaped, insures a powerful cam action on the lever-arms for the setting of the clamp-brake, which action, as manifest, is derived with comparatively slight manual force, and the setting, when secured, may be maintained through long periods without the painful hand pressure heretofore found necessary in bicycle brakes.

More specifically describing the part, F, comprising the two-faced cam, or wedge, seen in the drawings, it will be noticed that the plate is formed with the two slots, $y$, $y$, having downwardly converging directions, the inner boundary of each slot constituting the impinging surfaces of the wedge, while the outer boundaries of the slots constitute impingement surfaces for bearing on the studs, $f'$, $f'$, and insuring,—when the plate moves upwardly, as carried by the retracting spring, $k$, on the release of the hand pressure,—the reversed movement of the levers, D, D, for letting off the brake.

In Figs. 1, 2, and 3, the plate, F, is shown as provided with the forwardly extended lug, $n$, vertically perforated, through which perforation the thrust-rod is passed and secured by the set-screw or rivet, as indicated at $o$. In the aforesaid figures the brake retracting spring is shown as encircling the thrust-rod and having its ends in bearing against the lug, $m$, of the fork, and the lug, $n$, of the plate. The aforesaid transverse uniting portion, $b$, of the fork is formed with a boss or thickened portion, $p$, for receiving the screw, or pivotal stud, for each of the brake-levers, D, D.

While the bearing of each of the brake-shoes is sidewise upon the tire for a different and more advantageous manner of action than where the bearing is at the tread, nevertheless these sidewise bearings are not so far extended toward the rim as to have any contact with the latter or any such engagement with those portions of the tire surface adjacent the rim as to exert an action for the separation of the tire from its connection with the rim.

Having thus described our invention, what we claim, and desire to secure by Letters Patent, is—

In a velocipede, the combination with a wheel thereof, comprising a rim and its elastic tire, of a pair of levers intermediately pivoted, an arm of each being extended into proximity to the tire and having a bearing shoe opposite the portion of the tire which stands outwardly beyond the rim, and the other arms of said levers being extended into proximity, the one with the other and said arms having the studs, $f'$, $f'$, thereon, a plate, F, having the convergent slots, $y$, $y$, through which said studs protrude, the rod on which said part, F, is supported, and the brake-lever for operating it, substantially as and for the purpose set forth.

EDWARD G. SELDEN.
GEORGE D. CHAMBERLAIN.

Witnesses:
ELLA J. SELDEN,
H. A. CHAPIN.